UNITED STATES PATENT OFFICE.

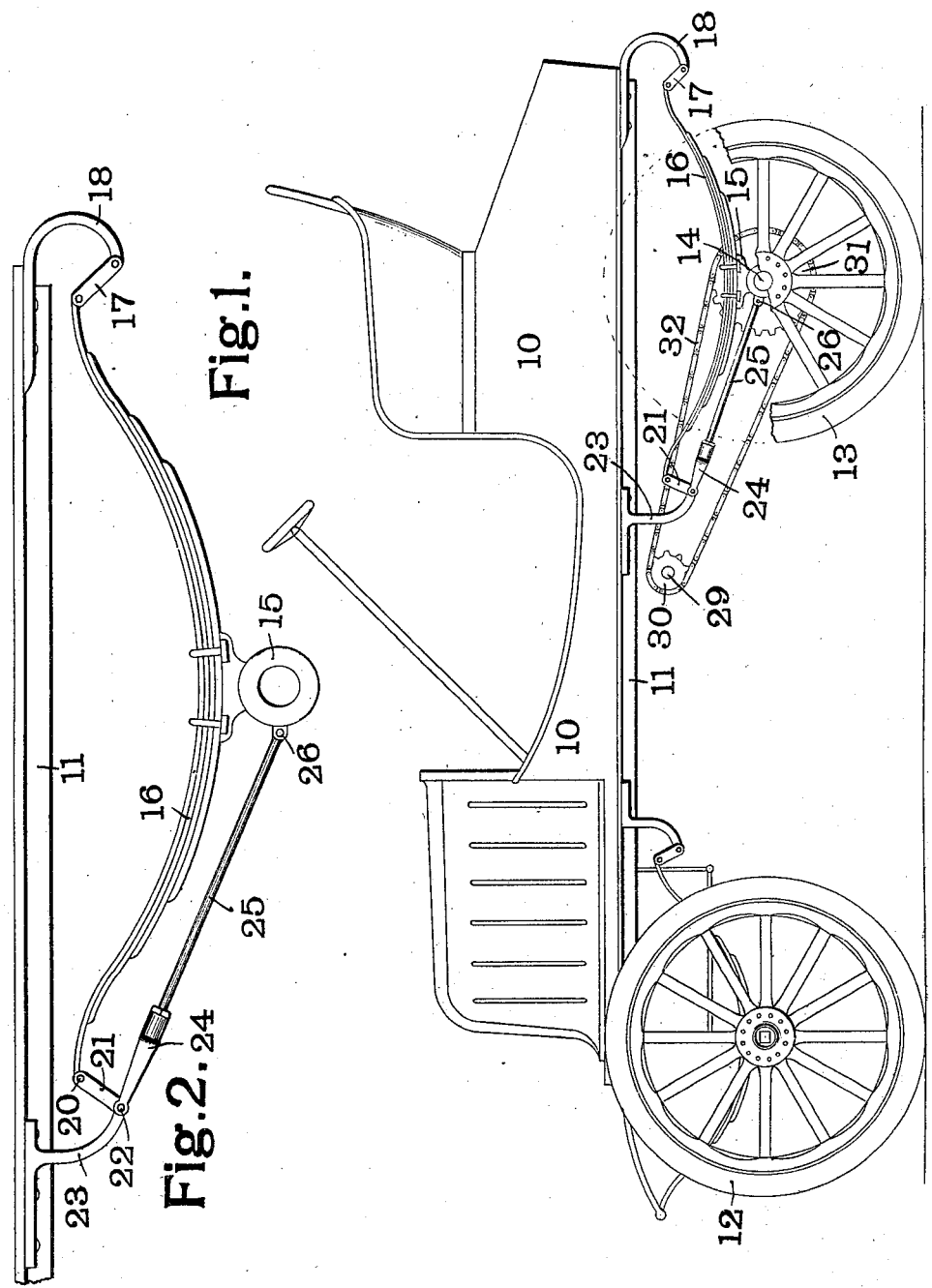

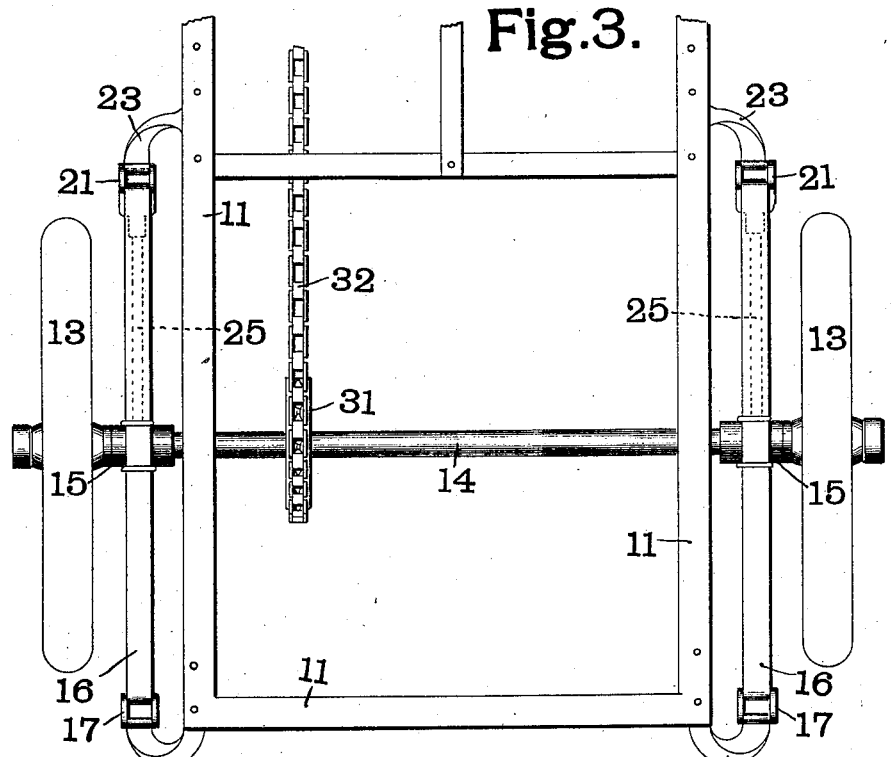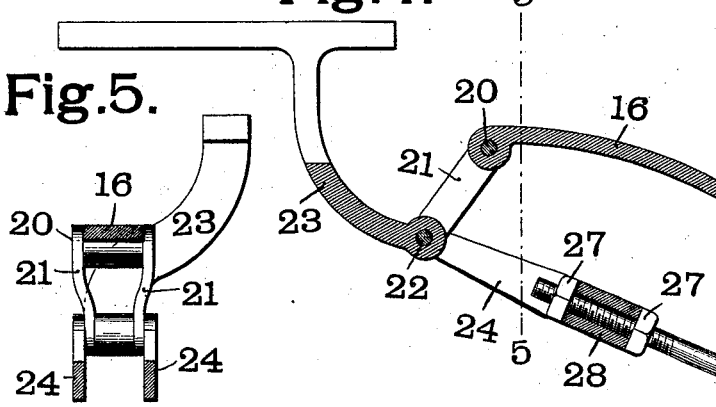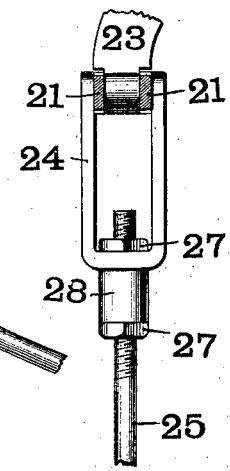

HENRY F. BORBEIN, OF ST. LOUIS, MISSOURI, ASSIGNOR TO GUS V. BRECHT BUTCHERS' SUPPLY COMPANY, OF ST. LOUIS, MISSOURI, A CORPORATION OF MISSOURI.

MOTOR-VEHICLE.

SPECIFICATION forming part of Letters Patent No. 708,793, dated September 9, 1902.

Application filed July 24, 1902. Serial No. 116,802. (No model.)

*To all whom it may concern:*

Be it known that I, HENRY F. BORBEIN, a citizen of the United States, residing at the city of St. Louis, in the State of Missouri, have invented a certain new and useful Motor-Vehicle, of which the following is such a full, clear, and exact description as will enable any one skilled in the art to which it appertains to make and use the same, reference being had to the accompanying drawings, forming part of this specification.

The object of my invention is to provide improved means for holding the driving-axle of a motor-vehicle at a uniform distance from the driving-shaft, whereby the driving-chain will be prevented from becoming slack.

My invention consists in the combination, with a supporting-frame for the body of the vehicle, of a spring, a bearing for the axle carried by said spring, a strut-rod attached to said bearing, a link pivoted at one end to said strut-rod and at the other end to said spring, and means for supporting the end of said strut-rod.

My invention also consists in certain other novel features and details of construction, all of which are described in the following specification and pointed out in the claims affixed hereto.

In the accompanying drawings, which illustrate a vehicle made in accordance with my invention, Figure 1 is a side view, some of the parts being broken away. Fig. 2 is an enlarged view showing details of construction. Fig. 3 is a top view of the rear part of the vehicle, the body being removed. Fig. 4 is an enlarged sectional view showing details of construction. Fig. 5 is a section on the line 5 5 of Fig. 4, and Fig. 6 is a top plan view of the parts shown in Figs. 4 and 5.

Like marks of reference refer to similar parts in the several views of the drawings.

10 is the body of the vehicle, which is supported upon a suitable frame 11, which is preferably made of angle-iron, as shown.

12 represents the front or steering wheels, and 13 the rear or driving wheels. The driving-wheels 13 are secured to the driving-axle 14. This driving-axle 14 is carried in bearings 15, secured to the rear springs 16. Each of the springs 16 is secured at one end by means of links 17 to a hanger 18, secured to the supporting-frame 11. The opposite end of the springs 16 is pivoted at 20 to one end of a pair of links 21, the opposite end of said pair of links 21 being pivoted at 22 to a hanger 23, secured to the supporting-frame 11.

Pivoted to the hanger 23 and links 21 at the point 22 is the bifurcated end 24 of a strut-rod 25, the opposite end of which is pivoted at 26 to the bearing 15. The strut-rod 25 passes through a sleeve 28, formed on the bifurcated end piece 24. The end piece is held in position upon the rod by means of two lock-nuts 27, and by loosening these nuts the length of the rod can be adjusted. 29, Fig. 1, represents the driving-shaft of the motor, which may be arranged at any point near the hanger 23. On the shaft 29 is a sprocket-wheel 30, around which and a sprocket-wheel 31 on the driving-axle 14 passes the driving-chain 32.

It will be evident that the strut-rod 25 will maintain the driving-axle 14 at all times at substantially the same distance from the driving-shaft 29, and hence that the chain 32 will be prevented from becoming slack. Inasmuch as the strut-rod 25 is not attached in any way to the driving-shaft 29, the running-gear of the vehicle may be first made, and afterward any suitable motor may be fitted to the vehicle, which cannot be done in case that the strut-rod reaches from the driving-axle to the driving-shaft. The construction of my device also allows of the use of semi-elliptical or half springs, thus bringing the body of the vehicle much closer to the ground than can be accomplished by using elliptical or full springs.

Having fully described my invention, what I claim as new, and desire to secure by Letters Patent of the United States, is—

1. In a motor-vehicle, the combination with a frame adapted to support the body, of a spring, a bearing for the driving-axle secured to said spring, a strut-rod secured to said bearing, a link pivoted at one end to said strut-rod and at the other to said spring, and means for supporting said strut-rod.

2. In a motor-vehicle, the combination with a frame for supporting the body, of a spring, a bearing carried by said spring, a strut-rod secured to said bearing, a link pivoted at one end to said strut-rod and at the other to said spring, and a hanger secured to said frame and supporting said strut-rod and link.

3. In a motor-vehicle, the combination with a frame for supporting the body, of a bearing for the driving-axle, a strut-rod attached to said bearing, a bifurcated end piece adjustably secured to said rod, and a hanger secured to said frame and pivoted to said bifurcated end piece.

In testimony whereof I have hereunto set my hand and affixed my seal in the presence of the two subscribing witnesses.

H. F. BORBEIN. [L. S.]

Witnesses:
W. A. ALEXANDER,
L. B. BEACH.